(12) United States Patent
Perry

(10) Patent No.: US 9,196,913 B2
(45) Date of Patent: Nov. 24, 2015

(54) MULTIPLE TRANSITION FLOW FIELD AND METHOD

(71) Applicant: AUDI AG, Ingolstadt (DE)

(72) Inventor: Michael L. Perry, Glastonbury, CT (US)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/227,888

(22) Filed: Mar. 27, 2014

(65) Prior Publication Data

US 2014/0212787 A1    Jul. 31, 2014

Related U.S. Application Data

(63) Continuation of application No. 13/143,796, filed as application No. PCT/US2009/000086 on Jan. 8, 2009, now Pat. No. 8,722,276.

(51) Int. Cl.
*H01M 8/04*    (2006.01)
*H01M 8/02*    (2006.01)
*H01M 8/10*    (2006.01)

(52) U.S. Cl.
CPC ........ *H01M 8/04201* (2013.01); *H01M 8/0258* (2013.01); *H01M 2008/1095* (2013.01); *Y02E 60/50* (2013.01)

(58) Field of Classification Search
CPC   Y02E 60/521; H01M 8/0258; H01M 8/0228; H01M 8/026; H01M 8/0263; H01M 8/0265; H01M 4/8807
USPC .................................................. 429/480, 514
See application file for complete search history.

(56) References Cited

U.S. PATENT DOCUMENTS

| | | | |
|---|---|---|---|
| 5,641,586 A | 6/1997 | Wilson |
| 5,700,595 A | 12/1997 | Reiser |
| 6,472,095 B2 | 10/2002 | Margiott |
| 6,485,857 B2 | 11/2002 | Perry et al. |
| 6,682,835 B2 | 1/2004 | Breault |

(Continued)

FOREIGN PATENT DOCUMENTS

WO    2005012197 A2    12/2005

OTHER PUBLICATIONS

International Bureau, PCT Notification Concerning Transmittal of International Preliminary Report, Jul. 21, 2011, 7 pages, International Application No. PCT/US2009/000086.

(Continued)

*Primary Examiner* — Cynthia H Kelly
*Assistant Examiner* — Monique Wills
(74) *Attorney, Agent, or Firm* — Seed IP Law Group PLLC

(57) ABSTRACT

A fuel cell includes a membrane electrode assembly having an anode side and a cathode side, a first gas diffusion layer adjacent the cathode side of the membrane electrode assembly, and a first flow field plate contacting the first gas diffusion layer. The first flow field plate includes a reactant inlet, a reactant outlet, and a plurality of flow field chambers separated from one another by at least one rib. The reactant inlet is separated from the plurality of flow field chambers by at least one rib and the reactant outlet is separated from the plurality of flow field chambers by at least one rib. The ribs are configured to force a reactant flowing from the reactant inlet to the reactant outlet to enter the first gas diffusion layer at least twice.

23 Claims, 5 Drawing Sheets

(56) References Cited

U.S. PATENT DOCUMENTS

| | | |
|---|---|---|
| 6,686,084 B2 | 2/2004 | Issacci et al. |
| 6,780,533 B2 | 8/2004 | Yi et al. |
| 6,869,709 B2 | 3/2005 | Shimotori et al. |
| 2002/0106546 A1 | 8/2002 | Perry et al. |
| 2003/0224239 A1 | 12/2003 | Carlstrom |
| 2005/0014048 A1 | 1/2005 | Yang et al. |
| 2007/0105000 A1 | 5/2007 | Chapman et al. |
| 2007/0178355 A1* | 8/2007 | Tighe et al. ............ 429/38 |
| 2008/0124591 A1 | 5/2008 | Darling et al. |
| 2009/0004522 A1* | 1/2009 | Rock et al. ............ 429/26 |
| 2012/0183881 A1* | 7/2012 | Sugita et al. ............ 429/482 |

OTHER PUBLICATIONS

International Searching Authority, PCT Notification of Transmittal of the International Search Report and Written Opinion, Aug. 21, 2009, 12 pages, International Application No. PCT/US2009/000086.

* cited by examiner

MULTIPLE TRANSITION FLOW FIELD AND METHOD

CROSS REFERENCE TO RELATED APPLICATION

This application is a continuation of U.S. patent application Ser. No. 13/143,796, filed on Jul. 8, 2011 and entitled "MULTIPLE TRANSITION FLOW FIELD AND METHOD".

BACKGROUND

The present invention relates in general to the management of a reactant in a fuel cell, and more particularly, to a flow field and method which optimizes reactant flow to electrodes in a fuel cell, such as a proton-exchange membrane fuel cell.

Fuel cell power plants are well known for converting chemical energy into usable electrical power, and have applications ranging from stationary power plants to automotive vehicles. Fuel cells typically include an electrolyte, which can be a liquid (e.g., phosphoric acid), a membrane (e.g., a proton exchange membrane) or a solid (e.g., a ceramic oxygen ion conductor), that is sandwiched between an anode electrode and a cathode electrode to form a cell assembly. The electrodes commonly contain a catalyst to promote the desired reactions. During operation, reactants are continuously supplied to the electrodes.

For example, in a proton-exchange membrane fuel cell the cell assembly is called a membrane-electrode assembly. On either side of the membrane electrode assembly are gas diffusion layers in contact with bipolar plates that comprise reactant flow fields for supplying a reactant fuel (e.g., hydrogen) to the anode, and a reactant oxidant (e.g., oxygen or air) to the cathode, the reactants diffusing through the gas diffusion layers to be evenly distributed on the anode or cathode catalyst layers. The hydrogen electrochemically reacts with the anode catalyst layer of the proton exchange membrane to produce positively charged hydrogen protons and negatively charged electrons. The electrolyte membrane only allows the hydrogen protons to transfer through to the cathode side of the membrane, forcing the electrons to follow an external path through a circuit to power a load before being conducted to the cathode catalyst layer. When the hydrogen protons and electrons eventually come together at the cathode catalyst layer, they combine with the oxidant to produce water and thermal energy. During operation of the fuel cell, the reactants (e.g., hydrogen, oxygen) are supplied to the electrode catalyst layers and the water produced at the cathode is removed from the fuel cell.

SUMMARY

A fuel cell includes a membrane electrode assembly having an anode side and a cathode side, a first gas diffusion layer adjacent the cathode side of the membrane electrode assembly, and a first flow field plate contacting the first gas diffusion layer. The first flow field plate includes a reactant inlet, a reactant outlet, and a plurality of flow field chambers separated from one another by at least one rib. The reactant inlet is separated from the plurality of flow field chambers by at least one rib and the reactant outlet is separated from the plurality of flow field chambers by at least one rib. The ribs are configured to force a reactant flowing from the reactant inlet to the reactant outlet to enter the first gas diffusion layer at least twice.

A reactant flow field includes a first reactant channel for receiving a reactant, a second reactant channel for conveying the reactant away from the flow field, a plurality of flow field chambers located between the first reactant channel and the second reactant channel. The first reactant channel is separated from the plurality of flow field chambers by at least one rib, the flow field chambers are separated from one another by at least one rib, and the plurality of flow field chambers are separated from the second reactant channel by at least one rib. The reactant flow field further includes a flow transition extending between the first reactant channel and the second reactant channel for directing flow of the reactant between the first reactant channel, the flow field chambers and the second reactant channel. The ribs are configured to force a reactant flowing from the first reactant channel to the second reactant channel to enter the flow transition at least twice before reaching the second reactant channel.

DETAILED DESCRIPTION

Figure 1:
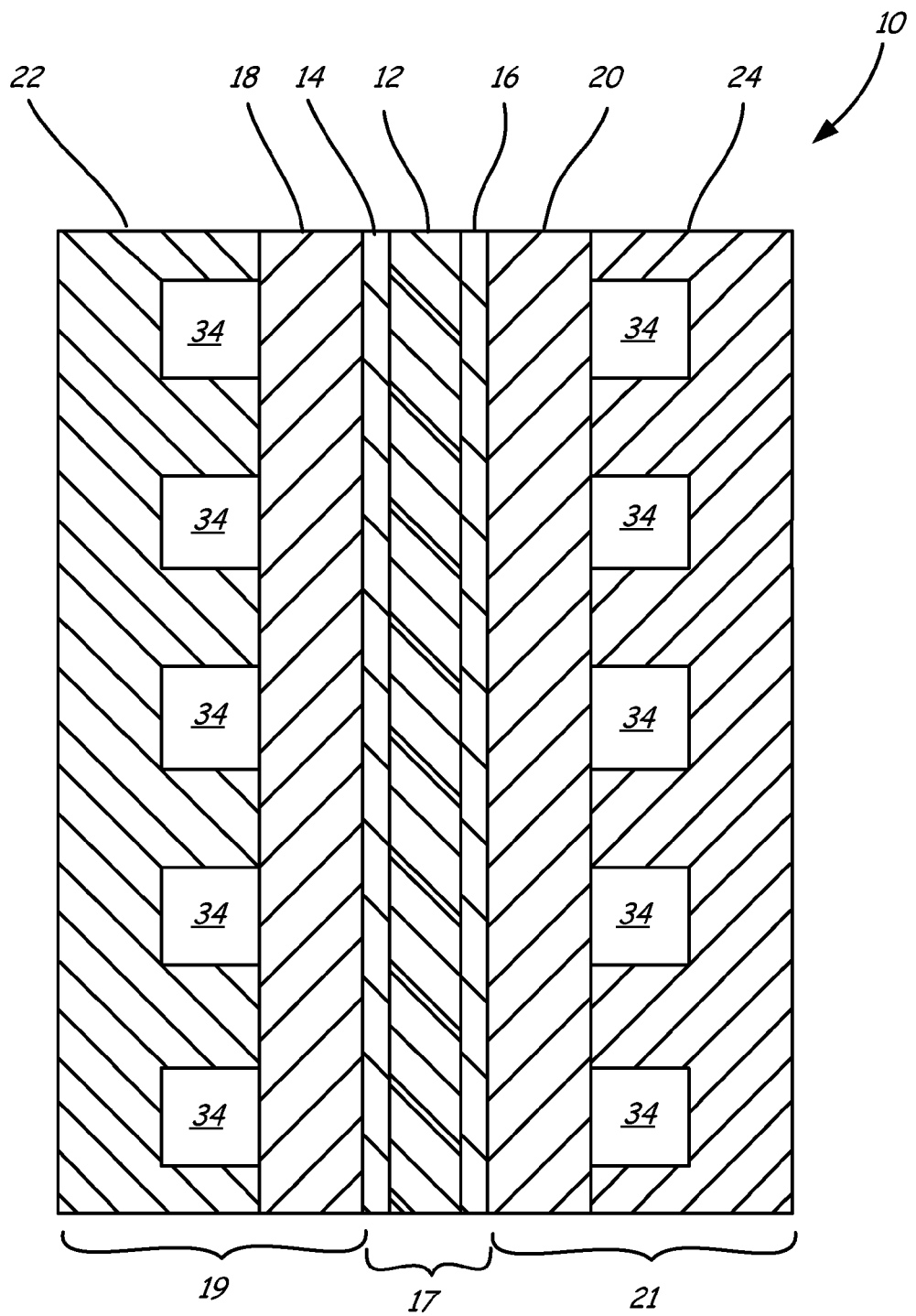
FIG. 1 is a cross section view of a proton exchange membrane fuel cell.

FIG. 1 illustrates a cross section view of one embodiment of proton exchange membrane fuel cell 10. Fuel cell 10 includes polymer electrolyte membrane ("PEM") 12, anode electrode 14, cathode electrode 16, gas diffusion layers 18, 20 and flow field plates 22, 24. Anode electrode 14 and cathode electrode 16 are located on opposite sides of PEM 12 and commonly contain catalysts such as platinum. Together, anode electrode 14, PEM 12 and cathode electrode 16 make up membrane electrode assembly ("MEA") 17. Gas diffusion layer ("GDL") 18 is adjacent anode electrode 14 and allows reactant fuel (e.g., hydrogen) to reach anode electrode 14. GDL 20 is adjacent cathode electrode 16 and allows reactant oxidant (e.g., oxygen) to reach cathode electrode 16. GDL 20 also allows product water, formed at cathode electrode 16, to migrate toward flow field plate 24. Flow field plates 22 and 24 are located adjacent GDLs 18 and 20, respectively. Together, flow field plate 22 and GDL 18 make up fuel flow field 19. Flow field plate 24 and GDL 20 make up oxidant flow field 21. Fuel flow field plate 22 directs reactant fuel to anode electrode 14. Oxidant flow field plate 24 directs reactant oxidant to cathode electrode 16. Flow field plates 22 and 24 also direct reaction product (i.e. water) away from MEA 17 and GDLs 18, 20. FIG. 1 illustrates flow field chambers 34 of flow field plates 22 and 24. Flow field chambers 34 are described in detail below.

One method of supplying reactants to the MEA in a fuel cell includes the use of an interdigitated flow field. One example of an interdigitated flow field is described in U.S. Pat. No. 6,780,533 to Yi et al. A flow field plate is separated from the cathode or anode electrode by a GDL. The flow field plate is interdigitated and contains alternating inlet channels and outlet channels arranged in a side-by-side array and facing the GDL. A reactant is delivered to the inlet channel under pressure but cannot exit the inlet channel directly. The reactant is allowed to exit the outlet channel but cannot enter the outlet channel directly. A rib separates adjacent inlet and outlet channels and serves as a barrier between the two channels. After the reactant enters the inlet channel it transitions to the outlet channel via the GDL. The high pressure causes the reactant to exit the inlet channel and enter the GDL. Once in the GDL, the reactant is in proximity to the MEA and is free to react at an electrode (or catalyst layer). Unused reactant and reaction product (i.e. water) transitions from the GDL to the outlet channels of the flow field plate. The lower pressure in the outlet channels causes the unused reactant and water to exit the GDL and flow to the outlet channels. Unused reactant and water then exits the flow field plate via the outlet channels.

Interdigitated reactant flow fields result in forced convection of a reactant toward the electrode catalyst layers so that a greater proportion of the reactant flowing through the reactant flow fields is utilized more efficiently. However, the forced convection cannot be achieved effectively without an increase in the pressure drop across the flow field. The increased pressure drop, in turn, requires a higher pressurization of the reactant gas, thereby consuming a greater proportion of the electricity which is generated by the fuel cell, which is called parasitic power. The suitability of fuel cells for any particular utilization is at least partly dependent upon its overall efficiency, including not only the efficiency of generating the electricity, but the cost (in power) of generating that electricity. The overall efficiency of the fuel cell is of great importance, particularly in mobile equipment, such as vehicles, which not only must transport a load, and the fuel cell, but also the fuel which is to be utilized, in one form or another.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Interdigitated flow fields allow for a single pass of reactant in the fuel cell and provide low susceptibility to membrane dry-out. The high pressure drop used in interdigitated flow fields also provides for more effective delivery of reactants to the fuel cell catalyst layers than parallel field flow. However, in some fuel cell applications an even larger increase in delivery of reactant to the MEA and the ability to remove product water from the fuel cell is desired. In these applications, interdigitated flow where reactant makes a single transition between the GDL and the flow field plate is insufficient. Embodiments of the present invention provide flow fields in which a reactant transitions between the flow field plate and the GDL multiple times. In these embodiments, reactant is delivered to the GDL, and consequently the MEA, with a greater frequency than previous delivery methods.

Figure 2:
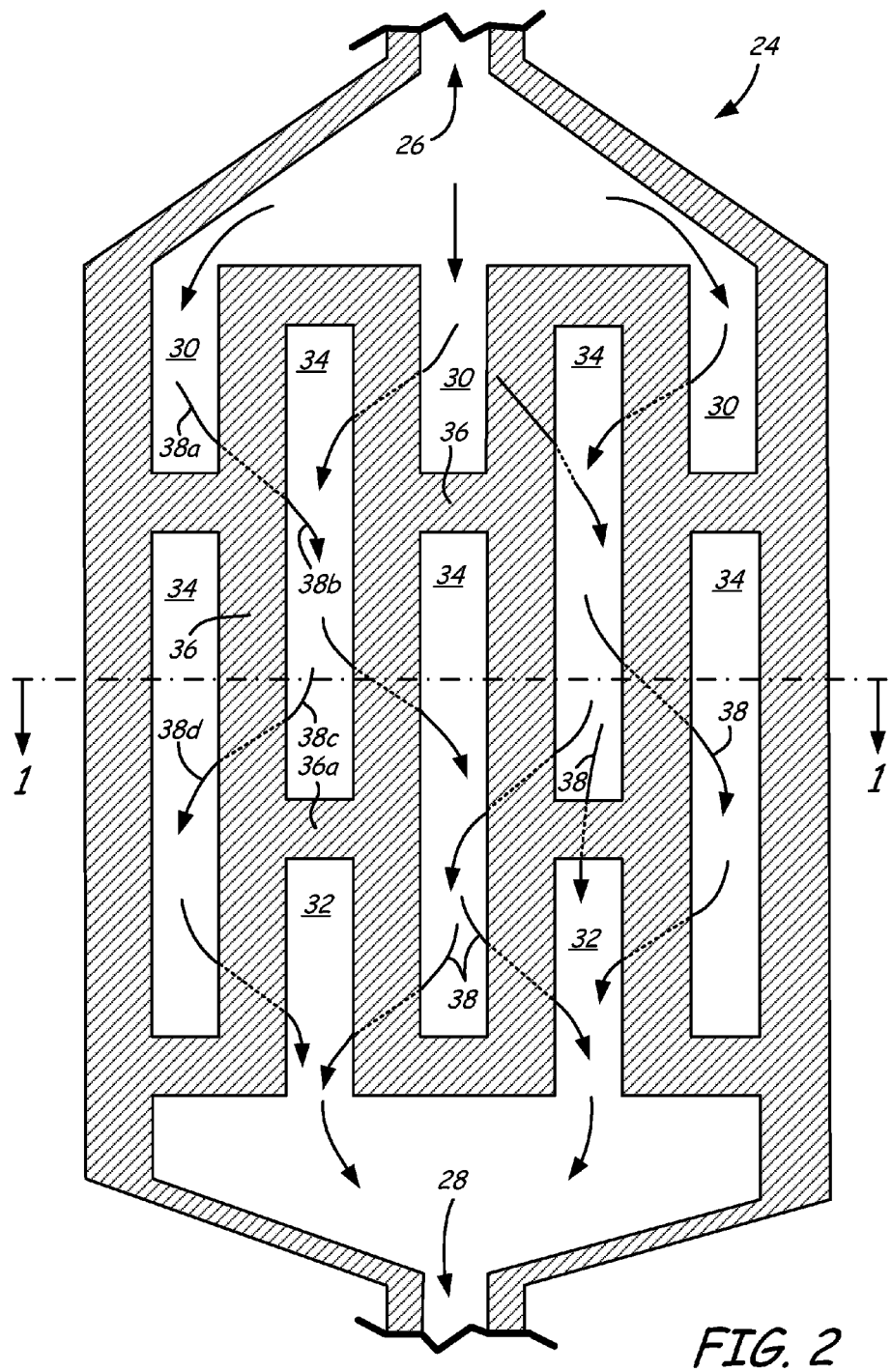
FIG. 2 is a stylized, simplified sectioned side elevation view of a multiple transition flow field plate.

FIG. 2 illustrates a cross section side view of one embodiment of flow field plate 24. Flow field plate 24 can be a fuel flow field plate or an oxidant flow field plate. For the purposes of the following description, flow field plate 24 will be referred to as an oxidant flow field plate. In one embodiment, oxidant flow field plate 24 is a metal plate. Suitable metals include, but are not limited to, stainless steel and titanium. In another embodiment, oxidant flow field plate 24 is a carbon plate. Regardless of composition, flow field plate 24 can be solid or porous. One example of a porous flow field plate is described in U.S. Pat. No. 5,700,595 to Reiser. Oxidant flow field plate 24 includes inlet 26 and outlet 28 and one or more inlet (first) channels 30, outlet (second) channels 32, flow field chambers 34 and ribs 36. Inlet 26 and inlet channels 30 receive oxidant delivered to oxidant flow field plate 24. Outlet 28 and outlet channels 32 convey oxidant and water produced at cathode electrode 16 away from oxidant flow field plate 24. Inlet channels 30, outlet channels 32, and flow field chambers 34 are separated from each other by ribs 36. In one embodiment, inlet channels 30, outlet channels 32, and flow field chambers 34 are arranged in a staggered array as shown in FIG. 2. Inlet channels 30, outlet channels 32, and flow field chambers 34 are grooves or channels located on a surface of oxidant flow field plate 24. In one embodiment, oxidant flow field plate 24 is a stamped metal plate where inlet channels 30, outlet channels 32, and flow field chambers 34 are stamped into oxidant flow field plate 24. In another embodiment, inlet channels 30, outlet channels 32, and flow field chambers 34 are machined on oxidant flow field plate 24.

As described above, oxidant flow field plate 24 is located adjacent to gas diffusion layer 20. Oxidant flow field plate 24 is positioned in fuel cell 10 so that one side of inlet channels 30, outlet channels 32, and flow field chambers 34 open towards GDL 20. Oxidant enters oxidant flow field plate 24 via inlet 26 and GDL 20 and leaves oxidant flow field plate 24 via outlet 28 and GDL 20.

Oxidant is initially delivered to oxidant flow field plate 24 via inlet 26 at elevated pressure. Oxidant flows from inlet 26 into inlet channel 30. Ribs 36 prevent oxidant from travelling directly towards outlet 28 through oxidant flow field plate 24. As pressure within inlet channel 30 builds near ribs 36, the oxidant transitions (represented by line 38a) from inlet channel 30 of oxidant flow field plate 24 to GDL 20 (not shown in FIG. 2). The dashed portion of arrows 38 represents oxidant flow in GDL 20. Oxidant enters GDL 20 and the oxidant is free to react at cathode electrode 16. Unused oxidant transitions from GDL 20 back to oxidant flow field plate 24 at flow field chamber 34 (represented by line 38b). Oxidant enters flow field chamber 34 at an area having localized fluid pressure lower than the fluid pressure of inlet channel 30 and GDL 20 above chamber 34. The continued delivery of oxidant to inlet 26 at elevated pressure causes oxidant to flow downstream in flow field chamber 34 (i.e. toward outlet 28). As pressure within flow field chamber 34 builds near downstream rib 36a, oxidant again transitions to GDL 20 (represented by line 38c). In GDL 20, oxidant is again free to react at cathode electrode 16. Unused oxidant transitions from GDL 20 back to oxidant flow field plate 24.

Depending on the particular path taken, oxidant transitions to a different flow field chamber 34 or outlet channel 32. Different transition paths exist within oxidant flow field plate 24 as represented by arrows 38. The particular paths taken by the oxidant are determined and influenced by the width of ribs 36 and the relative fluid pressures of inlet channels 30, outlet channels 32, and flow field chambers 34. Preferential reactant paths can be designated by changing the width of a rib 36 to accommodate increased or decreased flow across a particular rib 36.

Oxidant reaches outlet channel 32 after two or more transitions to GDL 20. Thus, after the oxidant transitions between oxidant flow field plate 24 and GDL 20 at least two times, oxidant flows through outlet channel 32 and to outlet 28 for removal from oxidant flow field plate 24. As illustrated in FIG. 2, oxidant may take one of multiple paths through oxidant flow field plate 24. Regardless of which path is taken, the oxidant transitions between oxidant flow field plate 24 and GDL 20 at least two times before exiting oxidant flow field plate 24.

While reference to FIG. 2 and the description above has been made to oxidant flow field plate 24, fuel flow field plate 22 may be similarly arranged to provide multiple transition flow of reactant fuel. In the case of fuel flow field plate 22, fuel transitions between fuel flow field plate 22 and GDL 18 at least two times before exiting fuel flow field plate 22.

The number of transitions a reactant (oxidant or fuel) makes between the flow field plate and GDL is determined by the number of flow field chambers 34 between inlet channels 30 and outlet channels 32. The greater the number of flow field chambers 34, the greater the number of transitions between flow field plate. Generally, the distance (vertical dimension in FIG. 2) from inlet 26 to outlet 28 is at least about 5 cm (2.0 in) and is typically longer (e.g., approximately 30 cm (11.8 in) for automotive applications). The width (horizontal dimension in FIG. 2) of one "column" of channels and chambers extending from inlet 26 to outlet 28 (as shown in FIG. 2) is generally about 0.5 cm (0.20 in). The number of flow field chambers 34 may be increased by adding additional ribs 36 to further subdivide flow field chambers 34.

A fuel cell having oxidant flow field plate 24 as described above generally has a higher absolute pressure and a higher pressure drop than a fuel cell having conventional interdigitated flow. This higher pressure drop is desirable in particular applications. For instance, a higher pressure drop can result in more uniform flow to all of the reactant channels (30, 32 and 34), even when reactant is fed into oxidant flow field plate 24 from a small manifold (inlet 26), as illustrated in FIG. 2. Additionally, a higher pressure drop can assist with product water removal from fuel cell 10. Liquid water produced at cathode electrode 16 can block oxidant reactant access to cathode electrode 16 or cathode catalyst layers. In fuel cell applications where the cell size must be kept relatively small (e.g., in a vehicle), embodiments of the present invention allow for increased pressure drop without changing flow field plate or channel sizes. Conventional fuel cells would require increasing the size of oxidant flow field 21 or decreasing the size of the reactant channels (30, 32 and 34) in oxidant flow field plate 24.

In an embodiment in which oxidant flow field plate 24 is a solid plate, the back pressure at inlet 26 is generally between about 50 kPa and about 200 kPa above ambient pressure. In one embodiment, the back pressure at inlet 26 is between about 100 kPa and about 200 kPa above ambient pressure. The back pressure at outlet 28 is generally between about ambient pressure and about 100 kPa above ambient pressure. In one embodiment, the back pressure at outlet 28 is between about 50 kPa and about 100 kPa above ambient pressure. These back pressures generate a pressure drop between about 50 kPa and about 200 kPa.

In an embodiment in which oxidant flow field plate 24 is a porous plate, the back pressure at inlet 26 is generally between about 15 kPa and about 50 kPa above ambient pressure. The back pressure at outlet 28 is generally about 0 kPa above ambient pressure. These back pressures generate a pressure drop between about 15 kPa and about 50 kPa.

In addition to increasing the availability of reactant at MEA 17, flow field plate 24 also improves the removal of product water from fuel cell 10. The increased pressure drop created by oxidant flow field plate 24, pushes water out of fuel cell 10 at oxidant flow field plate 24 more effectively than with conventional interdigitated flow. The pressure drop from inlet 26 to outlet 28 provides a more favorable path for product water to transition from GDL 20 to oxidant flow field plate 24 flow field chambers 34 and ultimately outlet 28. Effective removal of product water from MEA 17 is necessary to achieve optimal fuel cell performance.

Figure 3:
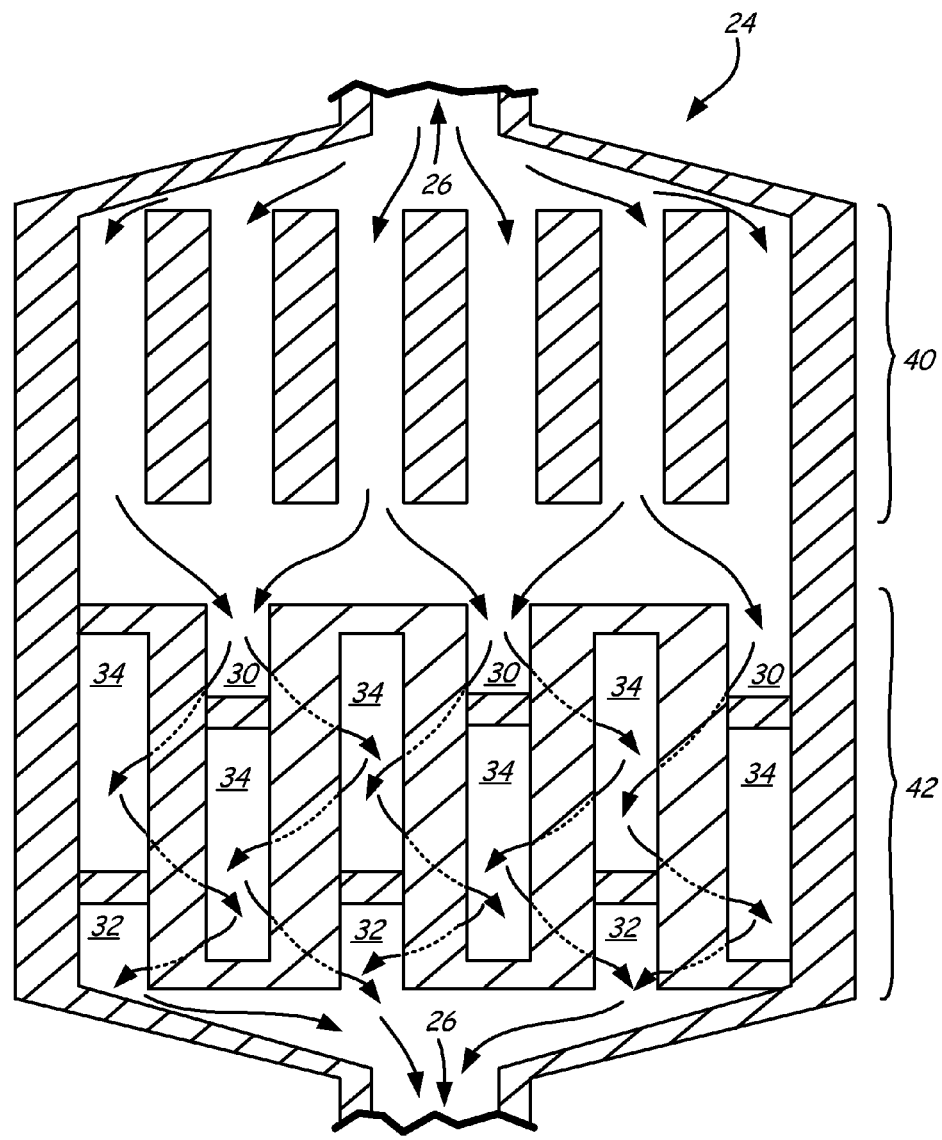
FIG. 3 is a stylized, simplified sectioned side elevation view of a hybrid flow field plate having parallel flow and multiple transition flow.
Figure 4:
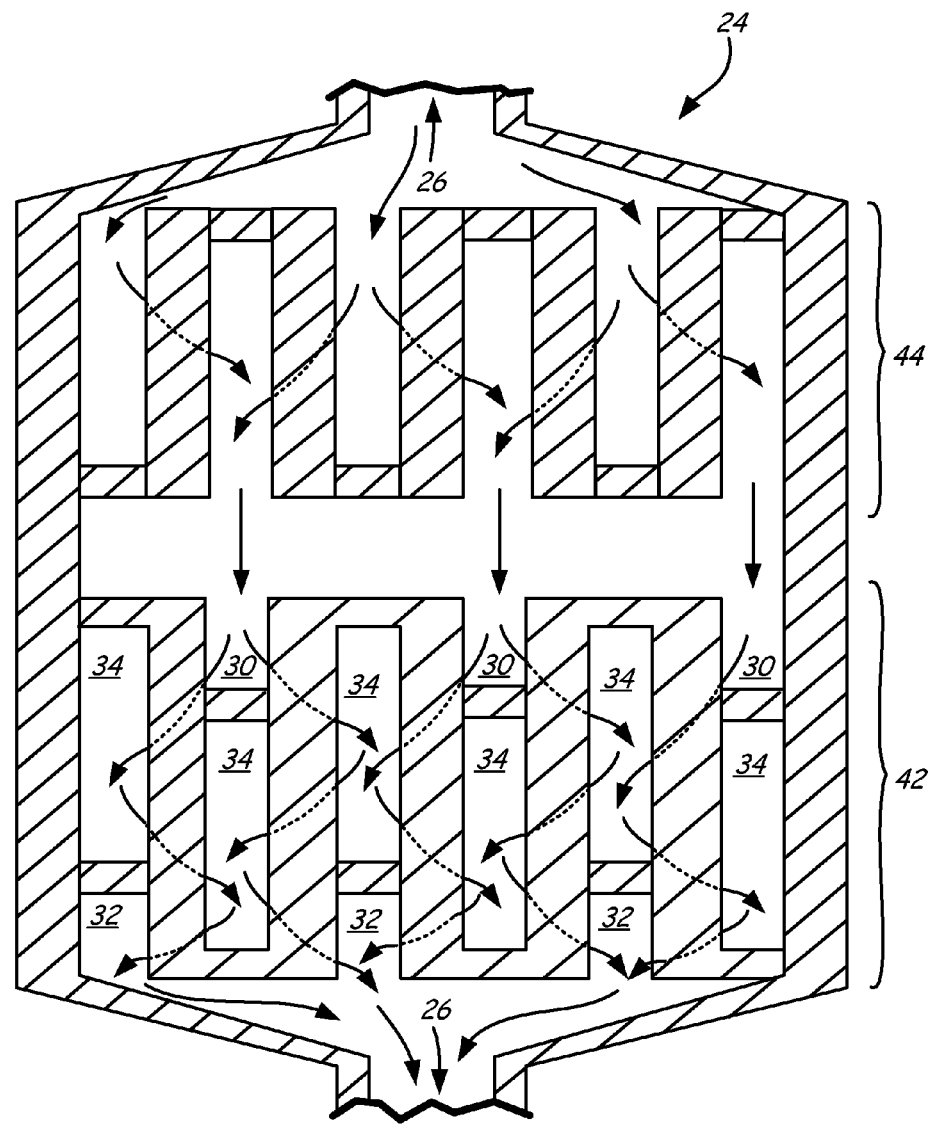
FIG. 4 is a stylized, simplified sectioned side elevation view of a hybrid flow field plate having interdigitated flow and multiple transition flow.
Figure 5:
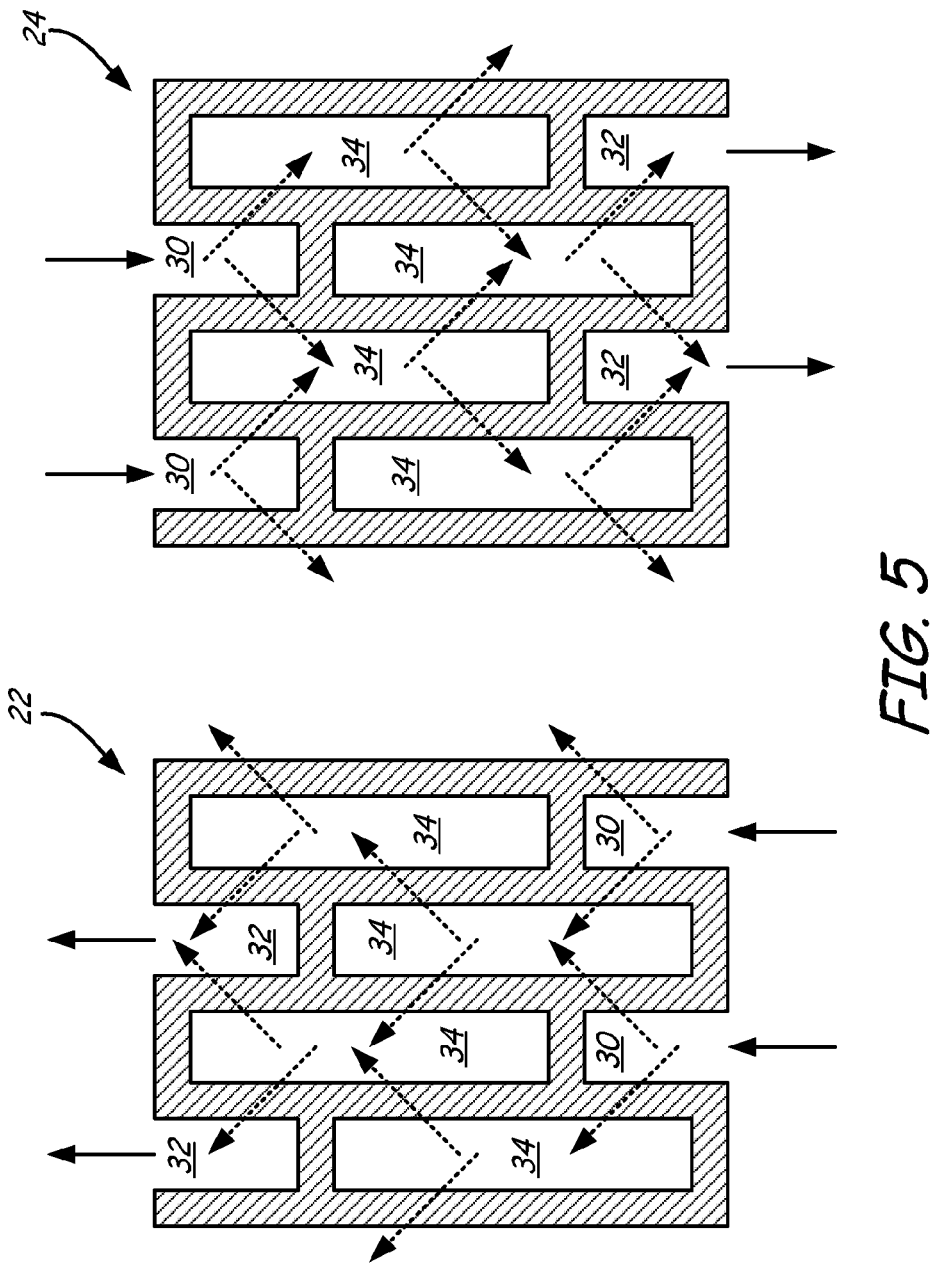
FIG. 5 is a simplified sectioned side elevation view of portions of two multiple transition flow field plates having counter flow.

Additional embodiments of flow field plates providing for multiple transitions of reactant into the GDL are illustrated in FIGS. 3 through 5. Hybrid flow field plates can be tailored to fit specific applications or specifications. FIG. 3 illustrates one embodiment where flow field plate 22, 24 includes parallel flow field section 40 and multiple transition flow field section 42. This configuration provides for slow reactant flow in parallel flow field section 40, which reduces the potential for dry-out near inlet 26 where the reactant is typically undersaturated. Additionally, the multiple transitions in multiple transition flow field section 42 help remove water from regions where product water tends to accumulate within fuel cell 10.

FIG. 4 illustrates one embodiment where flow field plate 22, 24 includes interdigitated flow field section 44 and multiple transition flow field section 42. This configuration provides the benefits of both interdigitated and multiple transition flow. Two multiple transition flow field plates can also be used in the same fuel cell on opposite sides of the MEA. FIG. 5 illustrates two multiple flow field plates 22, 24 having counter flow (indicated by arrows). Reactant fuel traversing fuel flow field plate 22 flows in the opposite direction of reactant oxidant traversing oxidant flow field plate 24.

Multiple transition flow field plates 22, 24 provide for a method of flowing reactant through a fuel cell. Reactant (oxidant or fuel) is delivered to a first flow field (inlet) channel 30 within flow field plate 22, 24. Reactant is then flowed to at least one flow field chamber 34. The reactant transitions from first flow field channel 30 to GDL 18 (fuel) or 20 (oxidant). Unused reactant transitions back to flow field plate 22, 24 to flow field chamber 34. Reactant is then flowed to a second flow field (outlet) channel 32. The reactant transitions from flow field chamber 34 to GDL 18 (fuel) or 20 (oxidant). Unused reactant transitions back to flow field plate 22, 24 to second flow field channel 32. From first flow field channel 30 to second flow field channel 32, the reactant transitions into GDL 18, 20 at least two times.

Multiple transition flow fields provide for increased delivery of reactant to the MEA. Because the reactant transitions into the GDL more frequently than in other flow regimes, the mass transport of reactant to the MEA is substantially improved. This allows for a greater rate of reaction at the MEA. In addition to the higher reactant availability at the MEA, multiple transition flow fields provide for more effective removal of product water from the MEA and GDL due to the larger pressure drop. The higher pressure drop can also provide for more uniform flow distribution to all of the reactant channels within a flow field.

While the invention has been described with reference to exemplary embodiments, it will be understood by those skilled in the art that various changes may be made and equivalents be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:
1. A fuel cell comprising:
    a membrane electrode assembly having an anode side and a cathode side;

a first gas diffusion layer adjacent the cathode side of the membrane electrode assembly;
a first flow field plate having a surface, the surface in contact with the first gas diffusion layer, the first flow field plate including:
 a first reactant inlet channel formed on the surface;
 a first reactant outlet channel formed on the surface;
 a plurality of ribs formed on the surface;
 a plurality of first flow field chambers physically separated from one another by ones of the plurality of ribs, the plurality of ribs and the plurality of first flow field chambers physically separating the first reactant inlet channel from the first reactant outlet channel, the plurality of ribs and the plurality of first flow field chambers being configured to force a reactant to leave the plurality of first flow field chambers and to enter the first gas diffusion layer at least twice.

2. The fuel cell of claim 1, wherein the reactant leaves the plurality of first flow field chambers at least three times before reaching the first reactant outlet channel.

3. The fuel cell of claim 1, wherein the reactant is delivered to the first reactant inlet channel at a pressure between about 50 kPa above ambient pressure and about 200 kPa above ambient pressure.

4. The fuel cell of claim 3, wherein the reactant exits the plurality of first flow field chambers at a pressure between about ambient pressure and about 100 kPa above ambient pressure.

5. The fuel cell of claim 1, wherein a pressure at the first reactant inlet channel is between about 50 kPa and about 200 kPa higher than a pressure at the first reactant outlet channel.

6. The fuel cell of claim 1, wherein the reactant is selected from the group consisting of oxygen, air, hydrogen, methanol, diesel, chemical hydrides and combinations thereof.

7. The fuel cell of claim 1, wherein the first flow field plate comprises a stamped metal plate.

8. The fuel cell of claim 1, wherein the plurality of first flow field chambers are generally parallel.

9. The fuel cell of claim 1, wherein the plurality of first flow field chambers are interdigitated flow field channels.

10. The fuel cell of claim 1, further comprising:
a second gas diffusion layer adjacent the anode side of the membrane electrode assembly;
a second flow field plate in contact with the second gas diffusion layer, the second flow field plate including:
 a second reactant inlet channel opposite the first reactant outlet channel of the first flow field plate;
 a second reactant outlet channel opposite the first reactant inlet channel of the first flow field plate;
 a plurality of second flow field chambers separated from one another by at least one rib, wherein the second reactant inlet channel is separated from the plurality of second flow field chambers by at least one rib and the second reactant outlet channel is separated from the plurality of second flow field chambers by at least one rib, and wherein the ribs are configured to force a reactant flowing from the second reactant inlet channel to the second reactant outlet channel to enter the second gas diffusion layer at least twice, and wherein the reactant of the second flow field plate generally flows in a direction opposite the reactant of the first flow field plate.

11. A reactant flow field comprising:
a first reactant channel;
a second reactant channel;
a plurality of ribs;
a plurality of flow field chambers located between the first reactant channel and the second reactant channel, the plurality of flow field chambers and at least one of the plurality of ribs physically separating the first reactant channel from the second reactant channel, the plurality of ribs and the plurality of flow field chambers being configured to force a reactant to leave the plurality of flow field chambers at least twice before reaching the second reactant channel.

12. The reactant flow field of claim 11, wherein the reactant leaves the plurality of flow field chambers at least three times before reaching the second reactant channel.

13. The reactant flow field of claim 11, wherein the reactant is delivered to the first reactant channel at a pressure between about 50 kPa above ambient pressure and about 200 kPa above ambient pressure.

14. The reactant flow field of claim 13, wherein the reactant leaves the plurality of flow field chambers at a pressure between about ambient pressure and about 100 kPa above ambient pressure.

15. The reactant flow field of claim 11, wherein a pressure at the first reactant channel is between about 50 kPa and about 200 kPa higher than a pressure at the second reactant channel.

16. The reactant flow field of claim 11, wherein the reactant is selected from the group consisting of oxygen, air, hydrogen, methanol, diesel, chemical hydrides and combinations thereof.

17. The reactant flow field of claim 11, wherein the plurality of flow field chambers are defined by a stamped metal plate.

18. The reactant flow field of claim 11, wherein the plurality of flow field chambers extend generally parallel to one another.

19. The reactant flow field of claim 11, wherein the plurality of flow field chambers are interdigitated flow field channels.

20. A fuel cell, comprising:
a membrane electrode assembly having a first side and a second side;
a first gas diffusion layer located adjacent to the first side of the membrane electrode assembly;
a first flow field plate having a first surface, the first surface positioned adjacent to and facing the first gas diffusion layer, the first flow field plate including:
 a first inlet located at a first end of the first flow field plate;
 a first outlet located at a second end of the first flow field plate;
 a plurality of first inlet channels in unimpeded fluid communication with the first inlet, the plurality of first inlet channels extending in a first direction;
 a plurality of first outlet channels in unimpeded fluid communication with the first outlet, the plurality of first outlet channels extending in the first direction;
 a plurality of first flow field chambers extending in the first direction; and
 a first wall structure, the first wall structure including a plurality of ribs and a portion extending in a second direction that is transverse to the first direction, the portion, the plurality of first flow field chambers, and the plurality of ribs physically separating the first inlet from the first outlet, the plurality of ribs and the plurality of first flow field chambers being configured to force a reactant to leave the plurality of first flow field chambers and enter the first gas diffusion layer at least twice.

21. The fuel cell of claim 20, further comprising:
a second gas diffusion layer located adjacent to the second side of the membrane electrode assembly;
a second flow field plate having a second surface, the second surface positioned adjacent to and facing the second gas diffusion layer, the second flow field plate including:
- a second inlet located at a first end of the second flow field plate;
- a second outlet located at a second end of the second flow field plate;
- a plurality of second inlet channels in unimpeded fluid communication with the second inlet, the plurality of second inlet channels extending in the first direction;
- a plurality of second outlet channels in unimpeded fluid communication with the second outlet, the plurality of second outlet channels extending in the first direction; and
- a second wall structure, the second wall structure including a portion extending in the second direction that is transverse to the first direction, the portion physically separating the plurality of second inlet channels from the plurality of second outlet channels.

22. The fuel cell of claim 20 wherein the plurality of first outlet channels are offset with respect to the plurality of first inlet channels in the second direction.

23. The fuel cell of claim 20 wherein the first flow field chambers are staggered with respect to the plurality of first inlet channels in the second direction.

* * * * *